United States Patent [19]

Porcello et al.

[11] Patent Number: 4,711,788

[45] Date of Patent: Dec. 8, 1987

[54] COOKIE FILLER COMPOSITIONS

[75] Inventors: Sam J. Porcello, Toms River; James M. Manns, Glenwood, both of N.J.; Kenneth W. Player, Dublin; Lonny L. Wilson, Brunswick, both of Ohio

[73] Assignee: Nabisco Brands, Parsippany, N.J.

[21] Appl. No.: 651,088

[22] Filed: Sep. 17, 1984

[51] Int. Cl.4 .......................... A23D 5/00; A23G 3/00
[52] U.S. Cl. .................................... 426/94; 426/572; 426/607; 426/613
[58] Field of Search .................. 426/572, 607, 94, 613

[56] References Cited

U.S. PATENT DOCUMENTS

| Re. 31,754 | 12/1984 | Miller et al. | 426/602 |
|---|---|---|---|
| 3,600,196 | 8/1971 | Heine et al. | |
| 3,949,105 | 4/1976 | Wieske et al. | 426/607 |
| 4,209,536 | 6/1980 | Dogliotti | 426/94 |
| 4,214,012 | 7/1980 | Ainger et al. | 426/607 |
| 4,388,339 | 6/1983 | Lomneth et al. | 426/602 |
| 4,410,557 | 10/1983 | Miller | 426/607 |
| 4,610,884 | 9/1986 | Lewis et al. | 426/103 |

FOREIGN PATENT DOCUMENTS

| 2403746 | 4/1979 | France . |
| 1013372 | 12/1965 | United Kingdom . |
| 1080998 | 8/1967 | United Kingdom . |

Primary Examiner—Robert Yoncoskie
Attorney, Agent, or Firm—Richard Kornutik

[57] ABSTRACT

A filler cream is disclosed which has a rapid "get away" that is achieved by aerating and mixing the filler cream to a specific gravity of between about 0.70 and about 0.82. The resulting filler cream utilizes fat or oleaginous compositions with specifically identified solid fat indexes. Specific oleaginous compositions suitable for use with this invention are disclosed.

7 Claims, No Drawings

COOKIE FILLER COMPOSITIONS

BACKGROUND OF THE INVENTION

1. Field Of The Invention

This invention relates generally to filler cream compositions and more specifically to filler cream compositions having rapid melting or "get away" characteristics upon consumption.

2. Description Of The Prior Art

Filler creams have been used in baked goods in a variety of ways. The common use is to insert a filler cream into a baked pastry by injection. Another common method is to use a filler cream as a laminate or "sandwich" material between two cookies. An example of this latter use is found in the cookies marketed under the Trademark OREO ®.

Filler creams of this type have consisted primarily of sucrose or sucrose in combination with other sugars, fat, and flavoring. Variations on this basic combination can lead to significantly different properties in a cream filler. Sugar combinations cause a filler cream to be too sweet for eating in large quantities or if artificial sweeteners are used the cream filler is too bitter to be palatable. Flavorings can vary the cream filler in numerous ways, however, the most common flavoring used is vanilla flavoring. The particular fat or oleaginous composition chosen has the greatest effect on the properties of a filler cream.

As is recognized from the prior art the fat or oleaginous composition used must be both edible and soft or "spreadable" at ordinary storage temperatures. The fat or oleaginous composition chosen should have good whipping and creaming properties so as to impart to the filler cream a light, consistent texture upon whipping or aeration. Also, the fat or the oleaginous composition chosen should have a palatable flavor without an after taste and should dissolve rapidly upon consumption. In commercial production, an ideal fat or oleaginous composition also has good shelf storage properties.

In general, it is desirable for a filler cream to have a short plastic range in which there is a high solid fat content at low temperatures and approximately no solid fat content at about 104° F. For example, the prior art discloses that at 50° F. the solid fat content of a filler cream should be 45 percent solid, at 80° F. it should be at least 25 percent solid at 92° F. it should be not less than 12.5 percent solid, at 100° F. it should be not greater than 3 percent solid and at 104° F. it should not be greater than 0.5 percent. The conclusion drawn from these parameters is that a good filler fat should retain its consistency at room temperature and melt completely and rapidly at body temperature. This last characteristic, due to the short plastic range, is commonly called "get away".

The whipping or aerating qualities of a filler fat refer to the ability of a filler cream to hold air incorporated into it. The air is sparged into the filler cream ingredients during manufacturing at about 95° F. The air should be retained by the filler cream at room temperature for several months. Various processes exist for whipping air into filler creams. The whipping or aerating process steps cause a filler cream to be "light" on the palate during consumption. This property is best understood by comparing a whipped cream product to a solid fat product such as margarine. A solid fat product melts slowly on the tongue and leave an oleaginous coating. A whipped cream product dissolves rapidly and, in the ideal circumstances, leaves little after taste.

The characteristics of an oleaginous composition can be altered without changing the oils it contains by altering the amount of hydrogenation of the oils, the ratio of various oils to one another in the composition, and the amount of fractionation of the oils. Increased hydrogenation usually is responsible for greater plasticity of the oleaginous composition used in the filler cream. A reference detailing the properties of various food oils is Weis, *Food Oils And Their Uses*, The AVI Publishing Company (2d ed. 1983).

Shelf life of a filler cream can be improved by incorporating antioxidants into the oleaginous composition. Antioxidants resist the development of undesirable flavors and odors of the fats or oils present in the cream filler by preventing rancidity. A three to nine month shelf life is desirable for commercial filler creams. Stability of the filler cream refers to its resistance to structural, microbial, flavor, and color degradation.

U.S. Pat. No. 3,244,536 to Kidger discloses a process for making a traditional filler cream used in sandwich cookies. The oleaginous composition used in this reference contains two components. The first component is a commercially hydrogenated fat with a high content of $C_{18}$ fatty acids. The second component which is a vegetable oil containing component has a high proportion of lauric acid. These two components are blended and subjected to interesterification. Any animal fats or vegetable oils can be used as the first component and tallow and lard are preferred for use as the second component. The vegetable oils used for the first component are identified in embodiments as coconut oil and palm kernel oil. The processes claimed by this reference lead to a filler cream which is pleasant tasting and has a good storage life, but does not have a quick "get away".

U.S. Pat. No. 2,359,228 to Lloyd et al. discloses a filler cream which has good storage properties which are achieved by incorporating into the cream dried starch conversion syrup solids. The use of dry corn syrup in place of dextrose stabilizes the moisture content within the final cookie product without producing a gritty filler cream. The filler cream of this reference again does not have a quick "get away".

U.S. Pat. No. 4,410,552 to Gaffeny et al. discloses an example of a filler cream. In this case it is used for chocolate candies in which the oleaginous composition is altered to improve and enhance "mouth feel". The materials used in this reference combine fats, sugars, water, and colloid substances, which are mixed and whipped together into a semi-plastic mass. The cream filler that is obtained does not have a texture which is either sticky or fatty like. The cream filler does not have a quick "get away" characteristic upon consumption.

U.S. Pat. No. 4,310,557 to Suggs et al. discloses food emulsifiers which are useful in producing filling creams and other products. The emulsifiers can produce products that are light in texture, but do not exhibit a quick "get away" upon consumption.

It is an object of this invention to produce a filler cream which has a quick "get away" when consumed. The filler cream according to this invention incorporates a filler fat, having an identified solid fat index, sugar, and a flavoring to produce a palatable, rapidly dissolving cream that has a stable storage life.

SUMMARY OF THE INVENTION

The oleaginous composition of this invention has a solid fat index from about 15 to about 34 percent solid material at 70° F. and from about 0.7 to about 6 percent solid material at 92° F. The filler cream of this invention has an oleaginous composition mixed with sugar and a flavoring. These ingredients are aerated and mixed to produce a composition which has a specific gravity of between about 0.70 to about 0.82, most preferably the specific gravity is between about 0.73 and about 0.77. This filler cream has a quick get away property. This property is such that the filler cream has a high solid content at normal storage temperatures, but melts upon contact with the tongue during consumption. The rapid melting of the oil composition allows the sugar and flavoring ingredients to quickly coat the tongue giving a rapid flavor sensation.

DETAILED DESCRIPTION OF THE INVENTION

The filler cream of this invention is prepared by first heating the fat or oleaginous composition to between about 105° F. and about 120° F. To the heated fat or oleaginous composition, flavorings and other non-sugar ingredients such as non-fat dry milk powder are added. To this mixture sugar is added. The sugar is not dissolved in the fat or oleaginous composition, but is added with mixing and forms a suspension.

Air sparging is then begun on this mixture. As the air sparging or aeration step begins, the mixture is rapidly mixed or whipped and the temperature of the mixture is dropped or cooled to below about 78° F. within approximately 5 minutes. The result of aeration, whipping, and cooling is the formation of a filler cream. The filler cream is transferred to a "sandwich unit" which applies the filler cream to base cakes or cookie pieces. Because of the melting properties of the filler cream, it is desirable to keep the sandwich unit cooled below about 70° F. during operation. The base cakes or cookie pieces must also be cooled upon their exit from an oven to below about 70° F. It is also desirable to package the final product containing filler cream in vapor proof packaging to prevent excessive moisture from being absorbed into the base cake.

The step of air sparging, mixing, and shock cooling is critical to producing a filler cream with the desired properties of this invention. The addition of sugar and the other ingredients to the heated fat or oleaginous composition lowers the mixture temperature to between 95° F. and 100° F. and has a specific gravity of between 1.18 to 1.22. Upon air sparging and rapid mixing of the mixture or "slurry" it is critical to obtain a filler cream specific gravity of between about 0.70 to about 0.82. The most desirable specific gravity for the filler is between 0.73 and 0.77. The high concentration of air in the filler cream gives it a lighter "feel" or sensation on the tongue during consumption. The low specific gravity of the filler cream coupled with a fat or oleaginous composition having a solid fat index according to this invention, results in the desired quick get away properties.

The solid fat index of the fat or oleaginous composition used is critical to achieving the properties required for a filler cream according to this invention. The solid fat index of the oleaginous composition is most critical between storage or room temperatures and body temperatures. A fat or oleaginous composition for use in this invention has a solid fat index according to the following table.

TABLE I

| °F. | SOLID FAT INDEX | |
|---|---|---|
| | % solid range | |
| 50 | 31.0 | 51.0 |
| 70 | 15.0 | 34.0 |
| 80 | 3.0 | 23.0 |
| 92 | 0.7 | 6.0 |
| 104 | 0.0 | 1.0 |

Fats and oil compositions within the above ranges produce a filler cream with the desired quick get away property.

A more desirable filler cream is achieved with a solid fat index in the following ranges.

TABLE II

| °F. | SOLID FAT INDEX | |
|---|---|---|
| | % solid range | |
| 50 | 32.0 | 42.0 |
| 70 | 12.0 | 20.0 |
| 80 | 3.0 | 15.0 |
| 92 | 0.7 | 4.0 |
| 104 | 0.0 | 0.0 |

Fats and oleaginous compositions containing mixtures having a solid fat index according to the above ranges can be obtained from numerous sources and can consist of numerous mixtures of oils, both fractionated and unfractionated, and having various degrees of hydrogenation. Oleaginous compositions for use in this invention can be obtained from Durkee Foods, a Division of SCM Corporation, 16651 Sprague Road, Strongsville, Ohio 44136. Durkee formulas D-2-3495 and D-2-3496 are examples of oleaginous compositions which can be used to achieve the desired properties of a filler cream according to this invention. Other oleaginous composition formulas can exist and function well in use with this invention.

The oleaginous compositions identified above were formulated specifically for use with this invention and were derived to meet the parameters established for use with this invention. In particular, Durkee formula D-2-3496 is desirable for use in the preferred embodiment of this invention. This formula is a combination of three oils each of which is partially hydrogenated. Those oils are:

TABLE III

| OLEAGINOUS COMPOSITION | |
|---|---|
| OIL | % OF VOLUME |
| Palm Kernel | 33-37 |
| Cotton Seed | 4-6 |
| Soybean | 63-57 |

In the preferred embodiment the palm kernel and the soybean oils are fractionated. Other suitable oleaginous compositions can contain palm kernel oil between 25 and 42 percent, cottom seed oil between 2 and 12 percent, and soybean oil between 73 and 46 with the total equal 100%.

The oleaginous composition of Durkee formula D-2-3496 has the following solid fat index:

TABLE IV

| SOLID FAT INDEX | |
|---|---|
| °F. | % SOLID |
| 50 | 39 |
| 70 | 17 |
| 80 | 7 |
| 92 | 1 |
| 104 | 0 |

Alternative embodiments include oil compositions similar to those listed in Table III, but containing palm oil or coconut oil. The inclusion of these or other oils can effect the taste of the filler cream without greatly varing the quick get away properties. Alternative embodiments containing these oils in combination with an emulsifier can also be used. For example polyglycerol esters in combination with palm kernel oil, cotton seed oil, and soybean oil can be used to produce a smooth cream filler with a quick get away. The preferred embodiment, however, does not contain emulsifiers. Emulsifiers can assist in the incorporation of sugar and other ingredients into a fat or oleaginous composition.

Mixture or slurry compositions generally contain about 40% of a fat or oleaginous composition and about 60% sugar. Mixtures containing less than 35% fats or oleaginous compositions are not creamy. More than about 45% fat or oleaginous composition in the cream filler causes it to be to thick or "heavy" when consumed.

In the preferred embodiment a stiffner of non-fat milk powder is added in an amount between about 3 to about 10%. Excessive amounts of non-fat milk powder cause the final texture of the filler cream to have a "gritty" feel on the tongue of a consumer. The absence of a stiffener such as non-fat milk powder does not adversely effect the quick get away properties of the filler cream. A filler cream made without a stiffener has the tendency to melt at near room temperatures after prolonged periods of storage. Lecithin can also be used as a processing aid to improve flow properties of the slurry.

Various flavorings can be added to the composition or they be excluded completely. In the preferred embodiment 0.9 ounces of vanilla are added to approximately 240 pounds of slurry. Alternative embodiments can include chocolate, coffee, or other flavorings. Suitable flavorings and extracts are commercially available.

Sugar is the primary ingredient of a cream filler made according to this invention. In the preferred embodiment a 10X sugar is sifted into the oleaginous composition before air sparging, mixing, and cooling. A 10X sugar is desirable because it dissolves rapidly upon contact with the tongue of a consumer. The particle size of a 10X sugar has the additional desirable quality of providing a smooth texture to the filler cream. Alternative embodiments can be made with 6X or coarser sugars. A sugar more coarse than 6X has the result on the cream filler of occasionally having a gritty texture due to the size of the sugar particles. A 12X or finer granulated sugar can be incorporated into alternative embodiments, but the extra cost of such sugar is not justified by a significant improvement in the taste of the filler cream.

The base cakes or cookie pieces used with a cream filler, according to this invention, need not be made from any special formulas. In the preferred embodiment a softer than average base cake is used. A soft base cake breaks apart more easily when bitten by a consumer. A hard base cake tends to resist breakage and causes a soft filler cream to be squeezed out of the sides of a sandwich cookie. With some base cakes an oil migration from the filler cream into the cake can occur during prolonged storage. This problem can be reduced or eliminated by altering the base cake formula such that it is prepared with less shortening or oil and then after migration of oil from the cream filler an acceptable oil concentration is achieved in the base cake. Alternatively, a film coating or wax coating can be applied to the layer of a base cake that receives the cream filler that performs as a barrier to the oil migrating from the cream filler.

The following example further illustrates the embodiment of this invention.

EXAMPLE I

A filler cream according to the preferred embodiment of this invention is prepared from the following ingredients:

| INGREDIENTS | QUANTITY | |
|---|---|---|
| | lbs. | ozs. |
| Powdered Sugar 10X | 137 | 7.1 |
| Filler Fat D-2-3496 | 100 | 0 |
| Non Fat Dry Milk | 12 | 8 |
| Natural Vanilla Flavor | 0 | 0.9 |

The filler fat is heated to 110° F. with mixing. To this the non-fat dry milk powder and vanilla flavor are added. The 10X powdered sugar is sifted and added slowly with continued mixing. The resulting slurry has a temperature of between about 95° F. and 100° F. and a specific gravity of 1.20.

Upon suspension of the sugar in the oleaginous composition, air sparging begins in conjunction with rapid mixing and cooling of the composition to 70° F. The air sparging and mixing continue until a filler cream of a specific gravity of 0.75 is obtained. In this example the aerating, mixing, and cooling is done in a turbine type mixing head machine with a series of pins on a rotor and a stator. The rotor turns at a high rate of speed. An example of such a machine in a Mini-Monodomix machine supplied by Mondomix, Reeweg 13, P.O. Box 98, 1394 ZH Nederhorst, Den Berg, Netherlands. The cream filler is transported to a temperature controlled sandwich unit that applies the filler cream to the base cakes.

We claim:

1. A filler cream having complete melting and rapid get away properties at body temperature, comprising:
   (a) an oleaginous composition containing a plurality of oils, said oils being selected from the group consisting of palm kernel oil, cotton seed oil, and soybean oil, said oleaginous composition having a solid fat index wherein there is:
   (i) 39 percent solid at 50° F.;
   (ii) 17 percent solid at 70° F.;
   (iii) 7 percent solid at 80° F.;
   (iv) 1 percent solid at 92° F.;
   (v) 0 percent solid at 104° F.; and
   (b) a sugar mixed into the oleaginous composition, the filler cream having a specific gravity of between about 0.70 and about 0.82.

2. The filler cream of claim 1 wherein the oleaginous composition is from 35 to 45 percent of the filler cream by weight.

3. The filler cream of claim 1 wherein the sugar is about 60 percent of the filler cream by weight.

4. The filler cream of claim 3 wherein the sugar is of a granulation at least as fine as 6X sugar.

5. A sandwich cookie comprising the filler cream of claim 1 as a laminate separating two cookie base cakes.

6. A process to make a filler cream, comprising:
 (a) heating an oleaginous composition containing a plurality of oils, said oils being selected from the group consisting of palm kernel oil, cotton seed oil, and soybean oil, said oleaginous composition having a solid fat index wherein there is:
  (i) 39 percent solid at 50° F.;
  (ii) 17 percent solid at 70° F.;
  (iii) 7 percent solid at 80° F.;
  (iv) 1 percent solid at 92° F.;
  (v) 0 percent solid at 104° F.;
 (b) blending a sugar into the oleaginous composition to form a slurry; and
 (c) aerating and mixing the slurry with simultaneous cooling to a temperature below 75° F., said aerated, mixed, and cooled slurry forming a filler cream, said filler cream having a specific gravity of between about 0.70 and about 0.82, said filler cream having complete melting and rapid get away properties at body temperature.

7. The process to make the filler cream of claim 6 wherein the sugar is of a granulation at least as fine as 6X sugar.

* * * * *